United States Patent
Kubota et al.

[11] Patent Number: 5,269,567
[45] Date of Patent: Dec. 14, 1993

[54] LINE JOINTING STRUCTURE FOR ELECTROSTATIC SPRAY COATING APPARATUS

[75] Inventors: Toshio Kubota; Nobunari Arai; Shoko Sasaki; Ichirou Ishibashi; Yukihito Ono; Niichi Toyama, all of Sayama, Japan

[73] Assignee: Honda Giken Kogyo Kabushiki Kaisha, Tokyo, Japan

[21] Appl. No.: 813,932

[22] Filed: Dec. 27, 1991

[30] Foreign Application Priority Data

Jan. 8, 1991 [JP] Japan .............................. 3-000140[U]
Jan. 8, 1991 [JP] Japan .............................. 3-000141[U]

[51] Int. Cl.$^5$ ............................................. F16L 11/12
[52] U.S. Cl. ....................................... 285/53; 285/158; 285/331; 118/621
[58] Field of Search ................ 285/52, 53, 54, 158, 285/45, 331; 118/621

[56] References Cited

U.S. PATENT DOCUMENTS

| | | | |
|---|---|---|---|
| 2,479,483 | 8/1949 | Ekleberry | 285/53 X |
| 2,564,302 | 8/1951 | Fraser | 285/158 X |
| 2,837,351 | 6/1958 | Bailey | 285/52 |
| 2,857,176 | 10/1958 | McTaggart et al. | 285/158 |
| 3,659,881 | 5/1972 | Tinsley et al. | 285/331 X |
| 4,547,623 | 10/1985 | Van Brunt et al. | 285/158 X |
| 4,794,937 | 1/1989 | Hofmann | 285/137.1 X |

FOREIGN PATENT DOCUMENTS

| | | | |
|---|---|---|---|
| 283033 | 3/1915 | Fed. Rep. of Germany | 285/158 |
| 2-2885 | 1/1990 | Japan. | |
| 96449 | 12/1960 | Netherlands | 285/158 |

Primary Examiner—Dave W. Arola

[57] ABSTRACT

Disclosed herein is a line jointing structure suitable for use in an electrostatic spray painting apparatus. The line jointing structure is used to connect to a device, an insulating line serving as a path for transportation of electrically conductive paint to which a high voltage is applied. The line jointing structure basically comprises a jointing member having a connecting portion capable of being inserted into an end of the insulating line, a sleeve disposed to cover an outer peripheral surface of the line, a nut for pressing the sleeve toward the connecting portion so as to connect the line to the connecting portion, the nut being fixedly mounted on the jointing member, and insulating seals disposed at both ends of the nut.

11 Claims, 7 Drawing Sheets

LINE JOINTING STRUCTURE FOR ELECTROSTATIC SPRAY COATING APPARATUS

BACKGROUND OF THE INVENTION

1. Field of the Invention:

The present invention relates to a line jointing structure suitable for use in an electrostatic spray coating apparatus, for connecting to a device, an insulating line serving as a path for conveying electrically conductive paint to which a high voltage is applied.

2. Description of the Related Art:

As a method of applying a high voltage to electrically conductive paint so as to electrostatically spray-coat an object or workpiece such as a vehicle body to be coated, with the conductive paint, there has heretofore been known a voltage blocking method, for example. This method has been disclosed in Japanese Patent Application Laid-Open No. 2-2885, for example. According to the disclosure, electrically conductive paint is first introduced into an intermediate reservoir from a paint feed source through an insulating line. Thereafter, the insulating line is washed and dried to create an electrically insulated state (voltage block), thereby preventing current from leaking to the paint feed source. Under this condition, the conductive paint to which the high voltage has directly been applied is supplied to an applicator from the intermediate reservoir, thereby electrostatically spray-coating an object or work with the conductive paint.

In this case, there is often a situation in which the applicator is normally mounted on a reciprocator, a robot, etc. Therefore, a flexible line is used as a path or passage for the transportation of paint. FIG. 1 shows a line connecting or jointing structure for joining the flexible line to another member. In the drawing, numeral 2 indicates a jointing member. One end of the jointing member 2 is coupled to a device 4 such as an applicator, etc., whereas the other end thereof is coupled to a line 10 by a sleeve 6 and a nut 8.

In the aforementioned line jointing structure, however, current tends to leak from a junction between said one end of the jointing member 2 and the device 4, from between the other end of the jointing member 2 and the nut 8 and from between the nut 8 and the sleeve 6. Accordingly, the jointing structure cannot maintain a desired high voltage as it is, thereby causing the problem that the efficiency of an electrostatic spray-coating process is reduced. When dust such as paint adheres to the range from the jointing member 2 to the joined portion and they communicate with each other, current assuredly leaks out. Consequently, it is feared that an electrostatic spray-coating process cannot reliably be carried out. When an electric conductor such as a robot arm approaches the jointing member 2, sparks are produced.

Further, in the above electrostatically spray-coating method of an internal voltage-application type, the range between the applicator and the intermediate reservoir is subjected to a high voltage through the paint over its entirety. Therefore, current leakage tends to occur. In particular, a line jointer for connecting a flexible line which forms a paint feed path to each of various devices develops great possibility of current leakage. There is also often a situation in which a flexible line exerts a counteracting force upon a line jointer for connecting the flexible line to an applicator or upon a line jointer for connecting the flexible line to an intermediate reservoir when the applicator is mounted on a robot or the like to move along a portion of an object or work to be coated with paint or to move reciprocatively. Thus, when an electrostatic spray-coating process is repeated, load acts on each line jointer, so that the flexible line and each line jointer are loosed or free from a state of their connection, thereby causing current leakage. As a result, a high voltage applied to electrically conductive paint changes from a desired value to another so as to make a state of an object or workpiece being electrostatically spray-coated with the paint unstable, thereby causing the problem that the object or workpiece which has been spray-coated with the paint is made inferior in quality.

In order to prevent the flexible line and each line jointer from working loose, there is therefore proposed a method of improving the strength of each line jointer. However, each line jointer must be enlarged in structure, thereby causing the problem that the electrostatic spray-coating or painting apparatus becomes large in size as a whole.

SUMMARY OF THE INVENTION

It is a principal object of the present invention to provide a line jointing structure suitable for use in an electrostatic spray-coating apparatus, which can effectively prevent leakage current and sparks from being produced and can easily be designed on a small scale.

It is another object of the present invention to provide a line jointing structure suitable for use in an electrostatic spray painting apparatus for directly applying a high voltage to electrically conductive paint so as to electrostatically spray-coat a workpiece with the paint, the line jointing structure comprising a jointing member having a connecting portion capable of being inserted into an end of an insulating line serving as a path for conveying the paint to which the high voltage is applied, a sleeve disposed to cover an outer peripheral surface of the line, a nut for pressing the sleeve toward the connecting portion so as to connect the line to the connecting portion, the nut being fixedly mounted on the jointing member, and insulating seals disposed in both sides of the nut.

It is a further object of the present invention to provide a line jointing structure wherein a pipe is disposed to cover an outer peripheral surface of the nut, and one of the seals is inserted into a space defined between one of both ends of the pipe and one of both ends of the nut.

It is a still further object of the present invention to provide a line jointing structure wherein the line serves as a multiline, and a minimum-diameter line of the multiline is coupled to the connecting portion, one of the seals being inserted into a space between an end of the remaining line of the multiline and the one end of the nut.

It is a still further object of the present invention to provide a line jointing structure wherein a screw thread portion is formed by an external surface of the jointing member and an internal surface of the nut.

It is a still further object of the present invention to provide a line jointing structure suitable for use in an electrostatic spray painting apparatus for directly applying a high voltage to electrically conductive paint so as to electrostatically spray-coat a workpiece with the paint, the line jointing structure comprising first and second members connected to each other for defining, in integral form, a path for conveying electrically conductive paint to which a voltage is to be applied, a hole defined in the first member, an insertion portion mounted on the second member and capable of being inserted into the hole, and an insulating seal disposed between the first and second members, whereby a screw thread portion is formed by an internal surface of the hole and an external surface of the insertion portion, and a creepage distance of said screw thread portion is selected to provide at most the creepage distance normally required to prevent undesired creepage discharge.

It is a still further object of the present invention to provide a line jointing structure wherein the first member constitutes a main body of each of devices such as an applicator, a storage tank, etc., and the second member forms a jointing member to which an insulating line is attached.

It is a still further object of the present invention to provide a line jointing structure suitable for use in an electrostatic spray painting apparatus for directly applying a high voltage to electrically conductive paint so as to electrostatically spray-coat a workpiece with the paint, the line jointing structure comprising first and second members connected to each other for defining, in integral form, a path for conveying electrically conductive paint to which a desired voltage is to be applied, a hole defined in the first member, and an insertion portion mounted on the second member and capable of being inserted into the hole, whereby a screw thread portion is formed by an internal surface of the hole and an external surface of the insertion portion, and a creepage distance of said screw thread portion is selected to provide at most the creepage distance normally required to prevent undesired creepage discharge.

It is a still further object of the present invention to provide a line jointing structure suitable for use in an electrostatic spray painting apparatus for directly applying a high voltage to electrically conductive paint so as to electrostatically spray-coat a work with the paint, the line jointing structure comprising first and second members connected to each other for defining, in integral form, a path for conveying electrically conductive paint to which a desired voltage is to be applied, a hole defined in the first member, and an insertion portion mounted on the second member and capable of being inserted into the hole, whereby a screw thread portion and a space are created by an internal surface of the hole and an external surface of the insertion portion, and the sum of a creepage length of the screw thread portion and an axial length of the space is selected to provide at least the creepage distance normally required to prevent undesired creepage discharge.

It is a still further object of the present invention to provide a line jointing structure suitable for use in an electrostatic spray painting apparatus for directly applying a high voltage to electrically conductive paint so as to electrostatically spray-coat a work with the paint, the line jointing structure comprising first and second members connected to each other for defining, in integral form, a path for conveying electrically conductive paint to which a desired voltage is to be applied, a hole defined in the first member, an insertion portion mounted on the second member and capable of being inserted into the hole, and fixing means for coupling the first and second members to each other, whereby a space is defined by an internal surface of the hole and an external surface of the insertion portion, and an axial length of the space is selected to provide at least the creepage distance normally required to prevent undesired creepage discharge.

It is a still further object of the present invention to provide a line jointing structure suitable for use in an electrostatic spray painting apparatus for directly applying a high voltage to electrically conductive paint so as to electrostatically spray-coat a work with the paint, the line jointing structure comprising a plurality of line jointers respectively connected to devices such as an applicator, a storage tank, etc. and to which flexible lines are coupled, and a plurality of line holding members for controlling the movements of the flexible lines against the line jointers respectively.

It is a still further object of the present invention to provide a line jointing structure wherein the line holding members are respectively attached to devices on which the line jointers are mounted.

It is a still further object of the present invention to provide a line jointing structure wherein the line holding members respectively form covers for covering the line jointers.

It is a still further object of the present invention to provide a line jointing structure wherein one of the covers comprises a cylindrical member and an engagement member attached to the cylindrical member and having a hole defined therein, the hole being used to insert a line therethrough, thereby controlling the movement of the line.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 1:
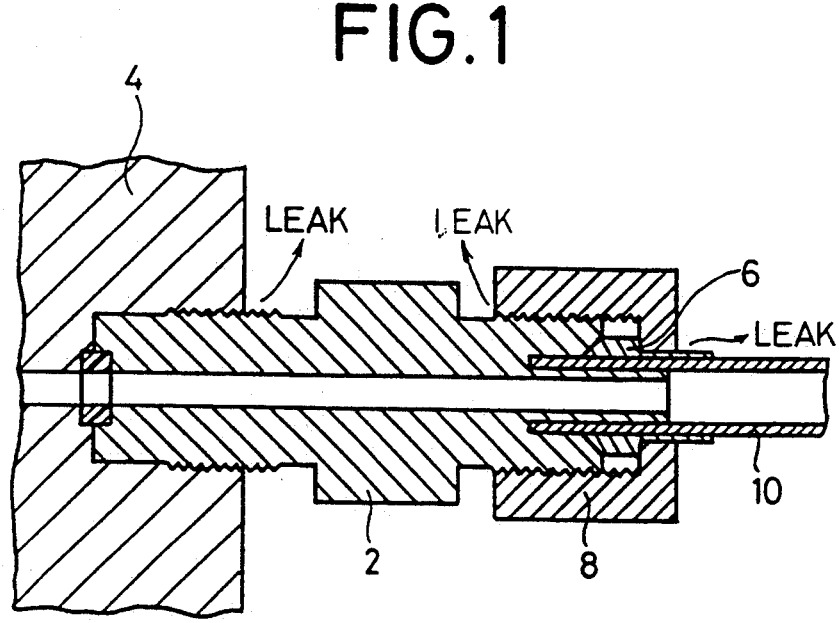
FIG. 1 is a vertical cross-sectional view showing a conventional line jointing structure.
Figure 2:
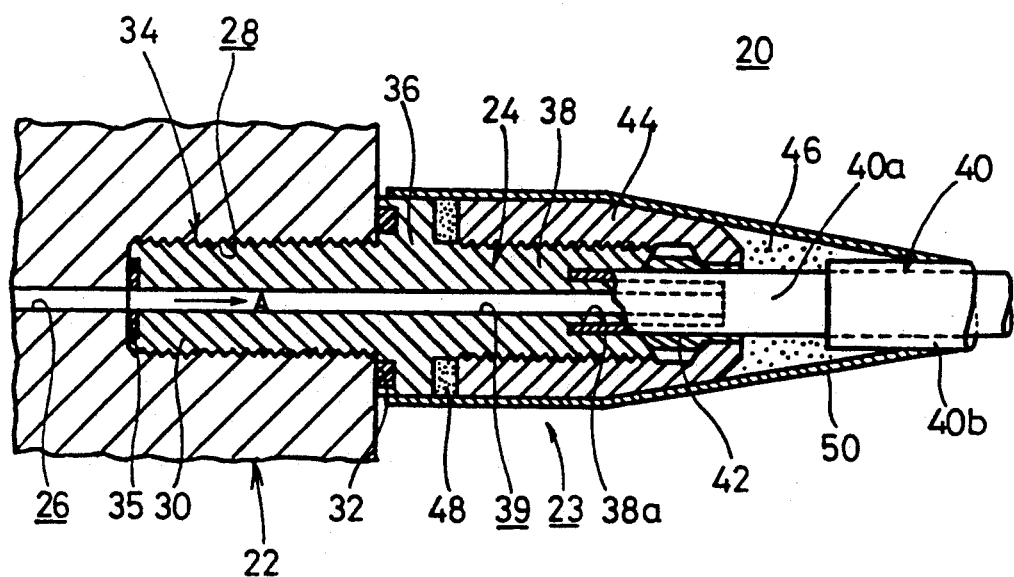
FIG. 2 is a vertical cross-sectional view illustrating a line jointing structure according to a first embodiment of the present invention.

Referring to FIG. 2, numeral 20 indicates a line jointing structure according to a first embodiment of the present invention. The line jointing structure 20 comprises a device (first member) 22 such as an applicator, etc., a line jointer 23 connected to the device 22, and a passage or path 26 formed integrally with the device 22 and the line jointer 23, for conveying electrically conductive paint to which a desired voltage is applied. The device 22 has a hole 28 defined therein. In addition, a jointing member (second member) 24 made of a resin, of the line jointer 23 has an insertion portion 30 formed therein capable of being inserted into the hole 28. There is disposed an insulating seal 32 between the device 22 and the jointing member 24.

The hole 28 has a female thread, i.e., an internal thread defined therein and the insertion portion 30 has a male thread, i.e., an external thread formed thereon. A screw thread portion 34 is formed by the internal thread and the external thread. The screw thread portion 34 is selected, i.e., set up to have a creepage length or below required to enable prevention of an undesired flow of electricity as will be described later. A description will now be made of the insertion portion, for example. In this case, the term "creepage length" represents the distance (hereinafter used as "creepage length or distance") extending in the longitudinal direction of the insertion portion along a cross-sectional form of the insertion portion. Specifically, it represents the distance extending in the axial direction of the screw thread portion 34 along a cross-sectional form of the screw thread portion 34. There is disposed between an end of the insertion portion 30 and the bottom face of the hole 28, a sealing member, i.e., a seal 35 for preventing electrically conductive paint from leaking out.

In addition to the insertion portion 30, the jointing member 24 has a flange 36, a protrusion 38, and a passage 39 which extends therethrough in its axial direction and constitutes the path 26. A connecting portion 38a attached to the protrusion 38 is inserted into a pipe 40a having the minimum diameter, of a line 40 as a multiline having insulating properties. An insulating sleeve 42 is disposed in such a manner as to cover an outer peripheral surface of the line 40. The sleeve 42 and the line 40 are coupled to the jointing member 24 by an insulating nut 44. There are disposed in both ends of the nut 44, insulating seals 46, 48. In addition, a pipe 50 made of silicon and used to cause the contraction of heat is disposed in such a way as to cover an outer peripheral surface of the nut 44.

As the line 40, a multiline made of a synthetic resin such as a tetrafluoroethylene resin is used. The multiline 40 has a wall thickness required to provide the insulation, and flexibility. If desired flexibility is given, then a single line may be used in place of the multiline 40.

Both slanted surfaces of the sleeve 42 are supported by an inner peripheral surface of the protrusion 38 and an inner peripheral surface of the nut 44. In addition, the line 40 is fixed to the connecting portion 38a.

The seal 46 is disposed in a space defined among one end of the nut 44, the pipe 50 and an end of another pipe 40b, and made of a hardening filler. On the other hand, the seal 48 is disposed in a space defined among the other end of the nut 44, the pipe 50 and a large-diameter portion of the jointing member 24, and made of a hardening filler.

A description will now be made of a case in which the line jointing structure 20 constructed as described above is assembled. First of all, the seal 35 is disposed in the leading end of the insertion portion 30 of the jointing member 24, whereas the seal 32 is disposed between a wall surface of the device 22 and the flange 36 of the jointing member 24. Under this condition, the insertion portion 30 of the jointing member 24 is threadedly inserted into the hole 28. Then, the connecting portion 38a is inserted into the line 40 on which the sleeve 42 is externally mounted. Thereafter, the nut 44 is threaded onto the protrusion 38 of the jointing member 24 so that the line 40 is coupled to the jointing member 24. Further, the spaces referred to above are respectively charged with the seals 46, 48 made of the hardening fillers, and the line 40, the nut 44 and the jointing member 24 are covered by the pipe 50, thereby finishing a process for coupling the line 40 to the jointing member 24. Consequently, the path 26 for conveying the electrically conductive paint is integrally formed in the device 22, the jointing member 24 and the line 40.

When electrically conductive paint is supplied in the direction indicated by the arrow A from the device 22, for example, it is moved toward the line 40 through the passage 39 and supplied to an object or workpiece to be coated therewith, thereby terminating an electrostatic spray painting process.

In the present embodiment, a connecting portion of the line 40 can reliably be electrically-insulated by an insulating creepage distance defined by the jointing member 24 and the nut 44 and insulating properties of the seals 46, 48. It is therefore possible to prevent leakage current and sparks from being produced when a high voltage is applied to the electrically conductive paint.

In addition, the overall length of the line jointing structure 20 can be shortened at a time by fixing the jointing member 24 and the nut 44 to each other with screw thread connection and disposing the seals 46, 48 in place. That is, any leakage current and spark can be avoided by reliably keeping a given creepage distance from a high-voltage unit. Therefore, if the jointing member 24 and the nut 44 are coupled to each other by using a parallel screw thread of 60°, then its axial length can be reduced to approximately ½ as compared with a case in which the screw thread is not used.

In the present embodiment, as well, the creepage length of the screw thread portion 34, which is defined by the internal surface of the hole 28 of the device 22 and the external surface of the insertion portion 30, is selected in such a way as to be shorter than a distance (necessary creepage length) at which air prevents leakage current and sparks from being produced when a high voltage is applied to the electrically conductive paint. In addition, the seal 32 is disposed within the surface at which the device 22 is joined to the jointing member 24. Thus, no current leakage occurs in the device 22 even when the high voltage is applied, and a spray painting process can efficiently be carried out while a desired voltage is being maintained. In addition, the entire length of the line jointing structure 20 can be shortened at a time. That is, if the parallel screw thread of 60° is used as the screw thread portion 34 to fit the insertion portion 30 into the hole 28 of the device 22, then its axial length can be reduced to approximately ½ as compared with a case in which the screw thread portion 34 is not used.

In addition, the creepage length or distance of the screw thread portion 34 can further be shortened by disposing the seal 32 in an end of a creepage surface of the screw thread portion 34. Described specifically, when a seal 32 composed of a tetrafluoroethylene resin is used upon application of a voltage of −60 kV, the breakdown voltage of the seal 32 is 20 kV/mm or so. Therefore, the surface of the seal 32 having a thickness of 2 mm can provide protection against a voltage of 40 kV. It is thus only necessary to ensure the creepage distance enough to provide protection against the remaining voltage of 20 kV. The creepage distance may actually be 50 mm or so. This means that the creepage distance can be reduced to ¼ or so as compared with a case in which the creepage distance at the time that the seal 32 is not provided is 200 mm or so. Therefore, the combination of the screw thread portion 34 and the seal 32 can reduce the creepage distance of the screw thread portion 34 to ¼ or so as compared with a case in which they are not used.

Incidentally, the present embodiment describes a case in which the single jointing member 24 is used. However, a jointing member having the protrusion 38 and the connecting portion 38a may be formed integrally with the device 22 itself.

Further, the present embodiments describes a case in which the hardening fillers are used as the seal 46, 48. However, a normally-used solid seal may be used if it has a desired thickness.

Figure 3:
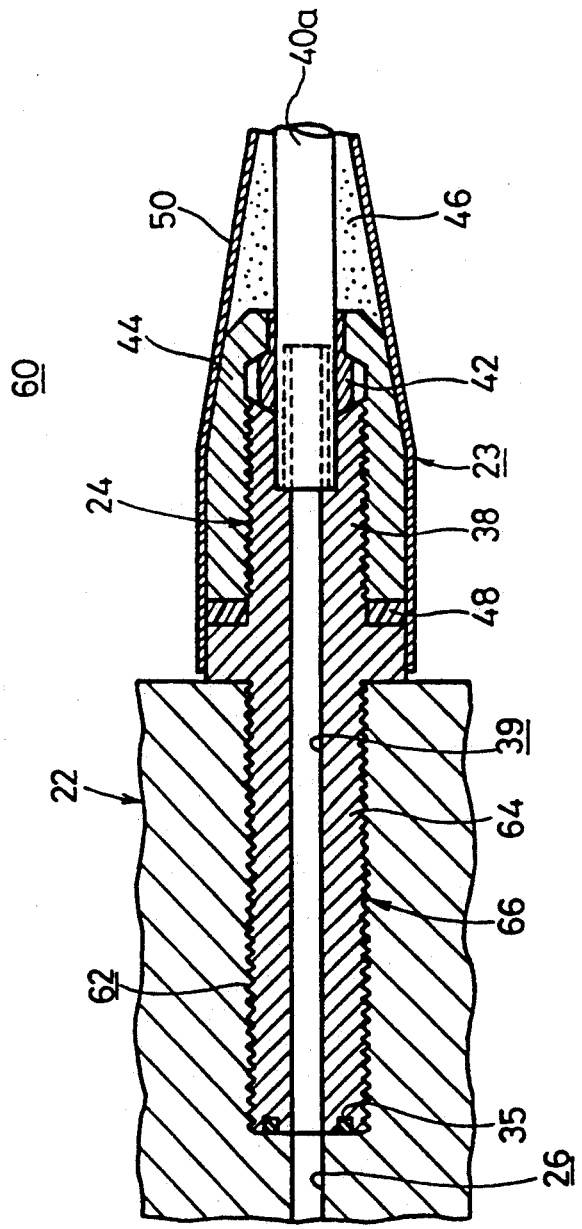
FIG. 3 is a vertical cross-sectional view depicting a line jointing structure according to a second embodiment of the present invention.

A line jointing structure 60 according to a second embodiment of the present invention will now be described with reference to FIG. 3. Incidentally, the same reference numerals as those employed in the first embodiment shown in FIG. 2 denote the same elements of structure as those employed in the first embodiment, and their detailed description will therefore be omitted.

The line jointing structure 60 is not provided with an insulating seal between a device 22 and a jointing member 24. Thus, a hole 62 longer than the hole 28 as viewed in the longitudinal direction is formed in the device 22. In addition, the jointing member 24 is formed with an insertion portion 64 longer than the insertion portion 30 as viewed in the longitudinal direction. A screw thread portion 66 is formed by an internal surface of the hole 62 and an external surface of the insertion portion 64. In addition, the screw thread portion 66 is selected, i.e., set up to have a creepage length or greater required to enable prevention of an undesired flow of electricity from occurring upon application of a high voltage.

The line jointing structure 60 can bring about an advantageous effect that any undesired flow of electricity can be avoided, and can effectively be used so long as nothing interferes even when the hole 62 and the insertion portion 64 are relatively long in particular.

A line jointing structure 70 according to a third embodiment of the present invention will now be described with reference to FIG. 4. Incidentally, the same reference numerals as those employed in the first embodiment shown in FIG. 2 denote the same elements of structure as those employed in the first embodiment, and their detailed description will therefore be omitted.

The line jointing structure 70 is not provided with an insulating seal between a device 22 and a jointing member 24. A screw thread portion 76 and a space 78 are formed by an internal surface of a hole 72 of the device 22 and an external surface of an insertion portion 74 of the jointing member 24. The sum of a creepage length of the screw thread portion 76 and an axial length of the space 78 is selected so as to be a creepage length or greater required to prevent an undesired current flow from being produced from between the device 22 and the jointing member 24.

It is thus possible to effectively prevent an undesired flow of electricity upon application of a high voltage to paint. The lengths of the hole 72 and the insertion portion 74 are respectively longer than those of the hole and the insertion portion employed in each of the first and second embodiments. However, they may be used in the device 22 of such a type that such a thing is not regarded as a problem. Incidentally, an insulating seal 32 may also be disposed in the line jointing structure 70 provided with the screw thread portion 76 and the space 78.

Figure 5:
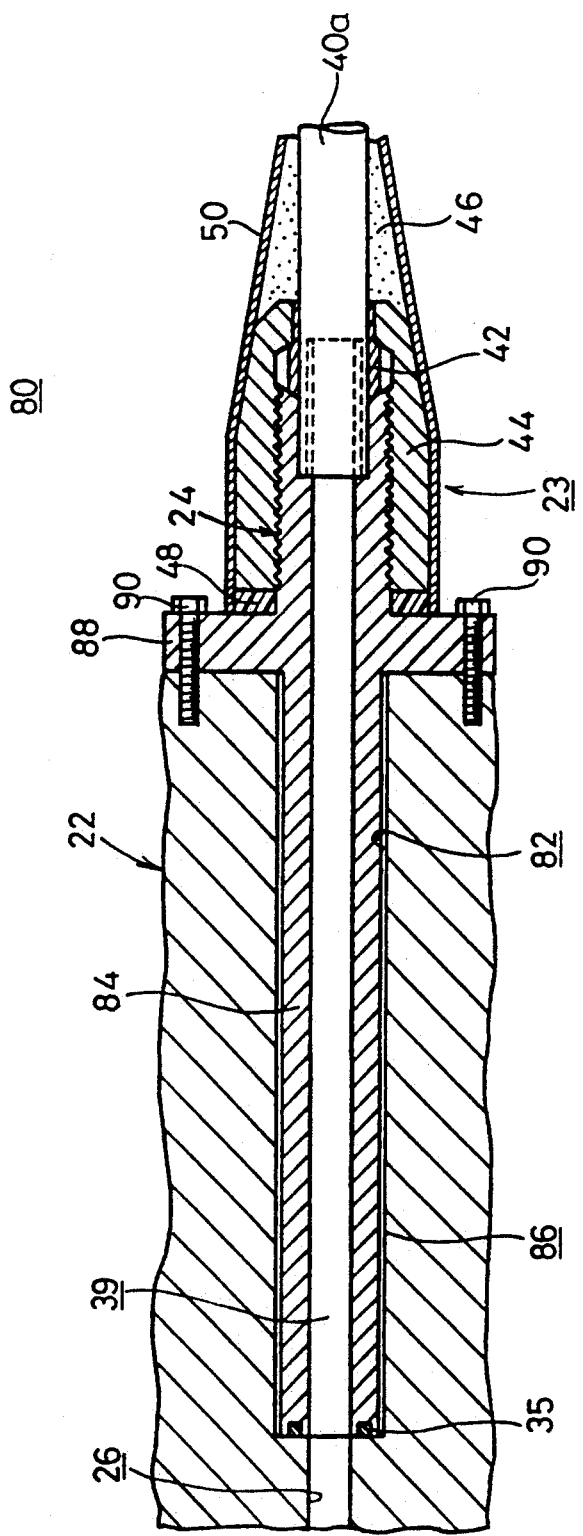
FIG. 5 is a vertical cross-sectional view illustrating a line jointing structure according to a fourth embodiment of the present invention.

A line jointing structure 80 according to a fourth embodiment of the present invention will now be described with reference to FIG. 5. Incidentally, the same reference numerals as those employed in the first embodiment shown in FIG. 2 denote the same elements of structure as those employed in the first embodiment, and will not be described in detail.

In the line jointing structure 80, a space 86 is defined by an internal surface of a hole 82 of a device 22 and an external surface of an insertion portion 84 of a jointing member 24. The axial length of the space 86 is selected in such a manner as to be a creepage length or above required to enable prevention of an undesired current flow from being produced from between the device 22 and the jointing member 24. The jointing member 24 has a large-diameter flange 88 formed therein. In addition, the flange 88 and the device 22 are integrally coupled to each other by a bolt (fixing means) 90. Thus, the line jointing structure 80 can effectively prevent current from leaking upon application of a high voltage to paint, and bring about the same advantageous effects as those of the above-described embodiments.

Figure 4:
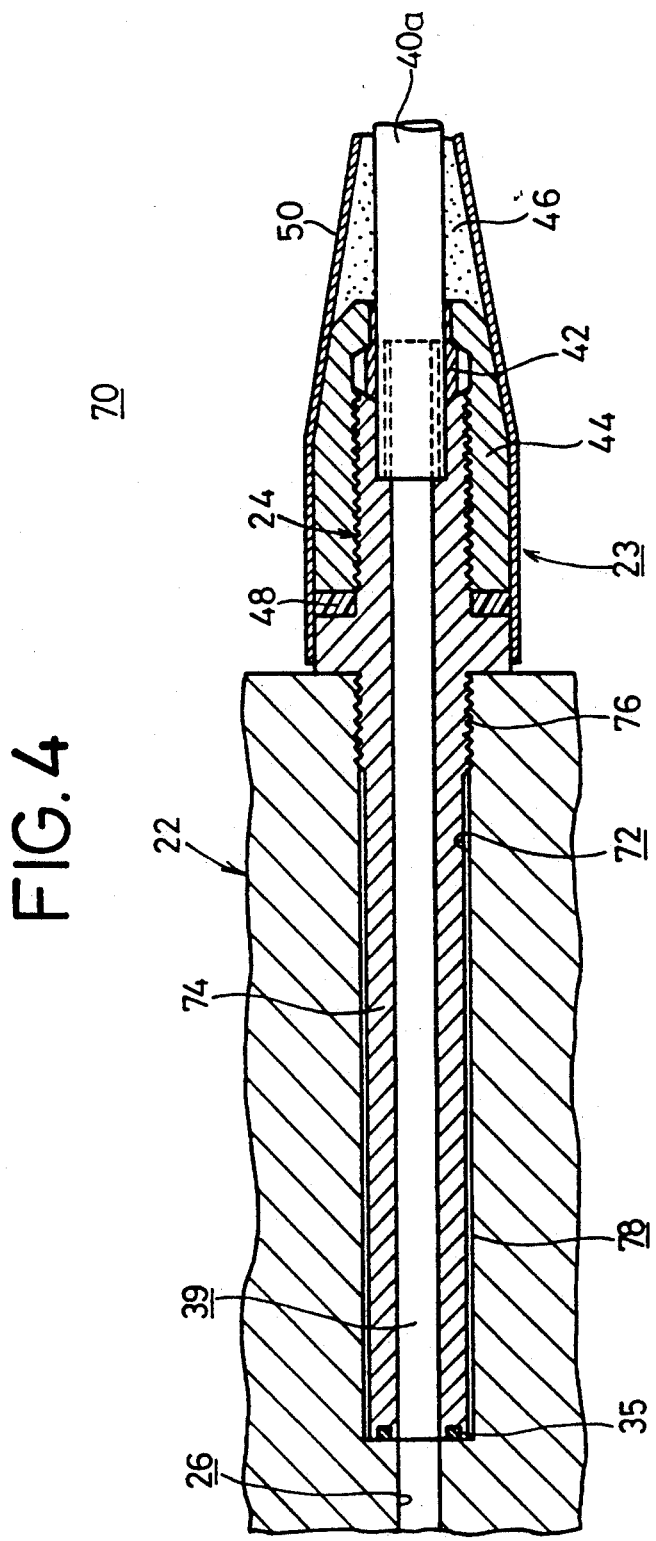
FIG. 4 is a vertical cross-sectional view showing a line jointing structure according to a third embodiment of the present invention.

Incidentally, the screw thread portion 76 employed in the third embodiment shown in FIG. 4 may also be used as a fixing means. An insulating seal 32 may also be disposed between the device 22 and the flange 88.

A line jointing structure according to a fifth embodiment of the present invention will now be described below in detail with reference to FIGS. 6 through 8.

Figure 6:
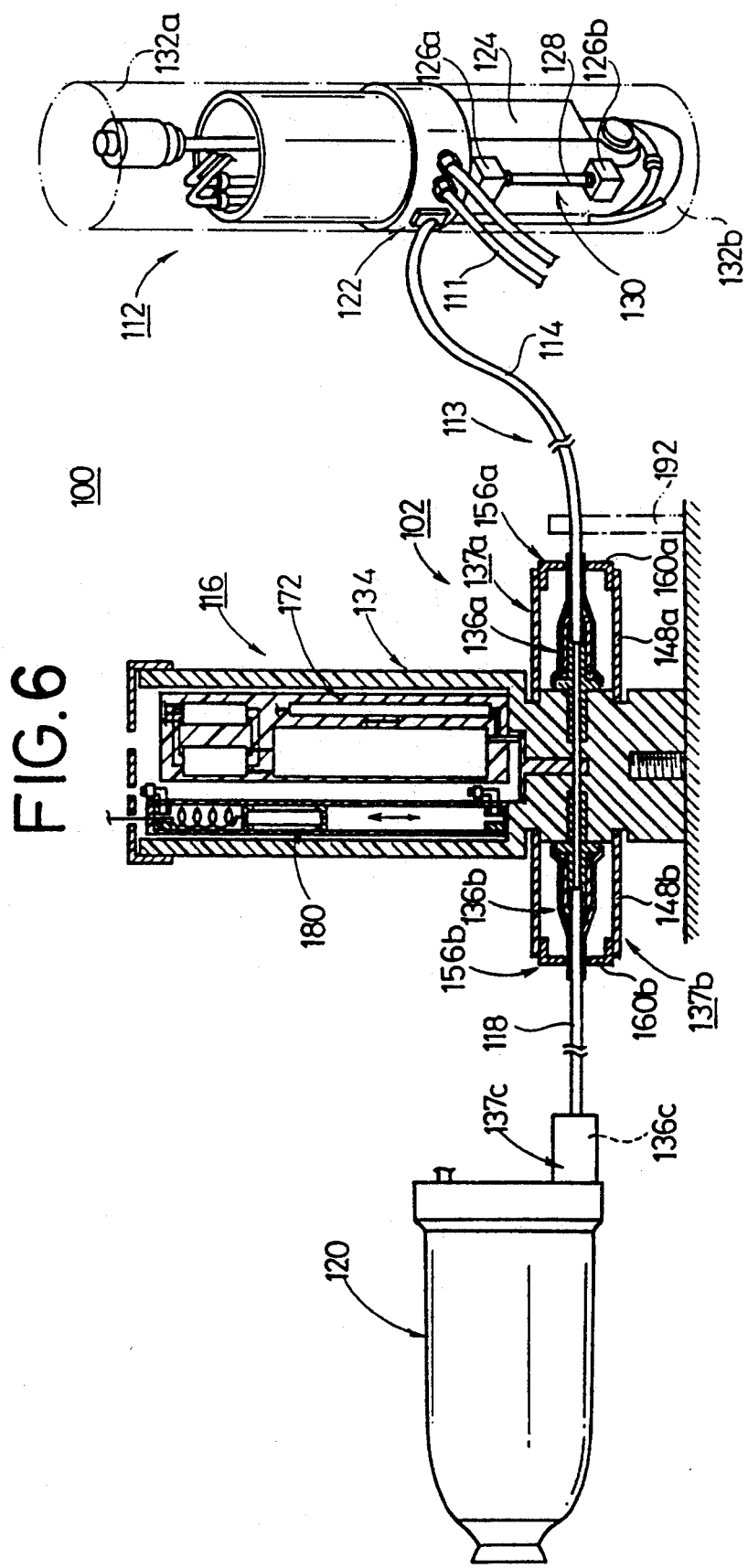
FIG. 6 is a view schematically showing the structure of an electrostatic spray coating apparatus in which a line jointing structure according to a fifth embodiment of the present invention is incorporated.

Referring to FIG. 6, numeral 100 indicates an electrostatic spray coating or painting apparatus incorporating a line jointing structure 102 according to the fifth embodiment therein. The electrostatic spray painting apparatus 100 comprises an intermediate storage unit 112 coupled to an unillustrated color changeover valve mechanism or the like by a pair of lines 111 each made of an electrically-insulating material, a voltage applying unit 116 coupled to the intermediate storage unit 112 by a flexible line 114 which constitutes a feed line 113 made of an electrically insulating material, and a spray gun 120 coupled to the voltage applying unit 116 by the flexible line The intermediate storage unit 112 comprises a manifold base 122 to which a plurality of lines 111, 114 or the like can externally be connected, a storage tank 124 formed integrally with the manifold base 122, for temporarily storing electrically conductive paint therein, an insulation mechanism 130 provided with a pair of three-way changeover valves 126a, 126b spaced a given distance away from each other and disposed along the storage tank 124 and with an insulating tube or line 128 having a length capable of providing insulation against a given high voltage, and covers 132a, 132b detachably mounted on the manifold base 122, for covering devices including the insulation mechanism 130.

Figure 7:
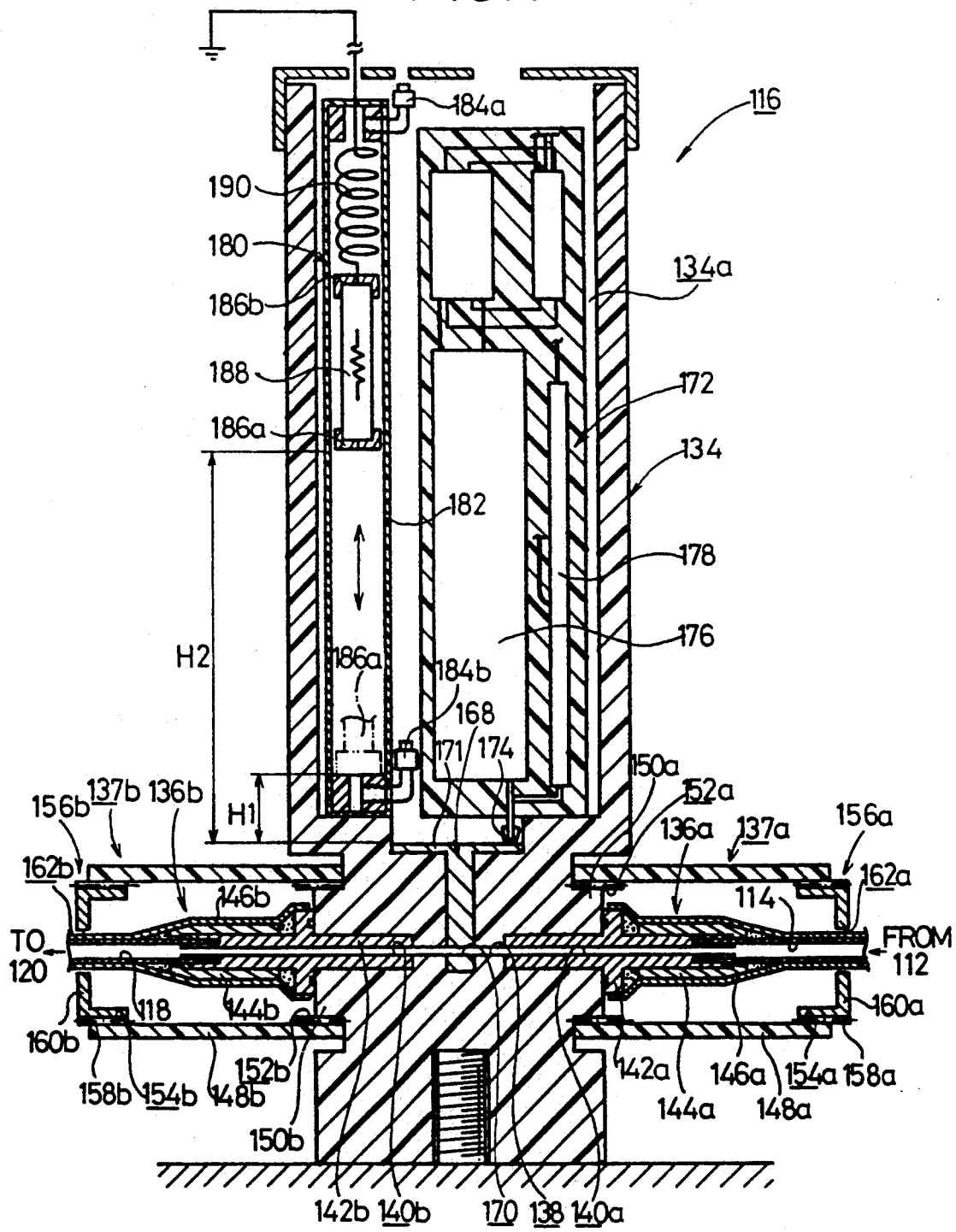
FIG. 7 is a vertical cross-sectional view showing a voltage applying unit of the electrostatic spray coating apparatus.

As shown in FIG. 7, the voltage applying unit 116 comprises an uprightly-disposed protection block 134 made of an electrically insulating material. Line jointers 136a, 136b of the line jointing structure 102 are attached to a lower part of the protection block 134. In addition, line holding members 137a, 137b for controlling the movements of the lines 114, 118 with respect to the line jointers 136a, 136b are releasably mounted on the lower part thereof. The line jointer 136a is threaded into the protection block 134, and has a jointing member 142a formed with a passage 140a which communicates with a passage 138 defined in the protection block 134, a nut 144a for connecting the line 114 to the jointing member 142a so as to cause the line 114 to communicate with the passage 140a, and a pipe 146a for covering the jointing member 142a and the nut 144a.

Incidentally, the aforementioned line jointing structures 20, 60, 70 and 80 can be used as the line jointing structure 102.

The line holding member 137a comprises a cylindrical member 148a made of an electrically insulating material, for covering the line jointer 136a. A thread channel or groove 152a threaded onto a screw thread portion 150a of the protection block 134 is defined in one end of the cylindrical member 148a. In addition, a thread channel or groove 154a is defined in the other end of the cylindrical member 148a. A screw thread portion 158a formed onto an outer peripheral surface of an engagement member 156a made of an electrically insulating material threadedly engages the thread groove 154a. A hole 162a for inserting the pipe 146a therethrough with the line 114 enclosed therein and for controlling the movement of the line 114 extends through a side face 160a of the engagement portion 156a. The cylindrical member 148a and the engagement portion 156a form a cover.

The line jointer 136b and its associated components are structurally identical to the line jointer 136a and its associated components described above, whereas the line holding member 137b and its associated components are structurally identical to the line holding member 137a and its associated member described above. The components associated with the line jointer 146b and the components associated with the line holding member 137b are therefore denoted by identical reference numerals with a suffix b, and will not be described in detail.

One end of an electric conductor 168 is held in front of the passage 138 of the protection block 134 and is formed with an electrically conductive passage 170 which communicates with the passage 138. The other end of the electric conductor 168 is formed with a horizontally-extending disk-shaped member 171, which is disposed in a hollow portion 134a of the protection block 134 and electrically connected to an output electrode 174 of a high voltage generator 172 molded with a resin. The high voltage generator 172 has a step-up circuit 176 and a bleeder resistor 178 cascade-connected to each other. The electrode 174 of the high voltage generator 172 is electrically connected to the output of the step-up circuit 176.

A grounding means 180 is disposed in the hollow portion 134a of the protection block 134 along the high voltage generator 172. In addition, the grounding means 180 has a container 182 made of a resin, which has opposite ends to which air pipes 184a, 184b are connected. Then, conductive piston members 186a, 186b are vertically movably disposed in the container 182 with a resistor 188 interposed therebetween, and a ground or earth line 190 is electrically connected to the piston member 186b. At a position (see the two-dot chain line in FIG. 7) where the piston member 186a is moved forwardly, i.e., upwardly, a distance H1 between the piston member 186a and the disk-shaped member 171 of the electric conductor 168 is selected in such a manner that electric charges which remain in conductive paint subjected to a high voltage to be described later can be discharged into the ground. In addition, a distance H2 between the piston member 186a at the position where it is withdrawn and the disk-shaped member 171 is selected in such a manner that air can provide insulation against the high voltage.

The spray gun 120 is provided with a line jointer 136c for the connection of the line 118, and a line holding member 137c for controlling the movement of the line 118.

The operation of the electrostatic spray painting apparatus 100 constructed as described above will now be described below.

First of all, electrically conductive paint of a given color pressure-fed from the color changeover valve mechanism (not shown) is introduced into the manifold base 122 of the intermediate storage unit 112 through the line 111. The paint is then supplied to the three-way changeover valve 126b from the three-way changeover valve 126a through the insulating line 128 and stored in the storage tank 124. The spray gun 120 is charged with the paint stored in the storage tank 124 by the line 114, the line jointer 136a, the protection block 134 of the voltage applying unit 116, the line jointer 136b, and the line 118.

Then, the switching action of the three-way changeover valves 126a, 126b of the insulation mechanism 130 is carried out to clean and dry the three-way changeover valves 126a, 126b and the insulating line 128, so that the color changeover valve mechanism is electrically insulated from the storage tank 124. The paint stored in the storage tank 124 is pressure-fed to the spray gun 120, and the voltage applying unit 116 is energized. Therefore, a high voltage stepped up or increased by the step-up circuit 176 is directly applied to the paint which flows through the passage 170 defined in said one end of the electric conductor 168, through the electric conductor 168 by the electrode 174. Thus, the paint is discharged from the spray gun 120 in a state in which a desired high voltage is being applied to the paint, so that an unillustrated work is electrostatically spray-coated with the discharged paint.

Immediately after the paint has been discharged from the spray gun 120, the high voltage generator 172 of the voltage applying unit 116 is de-energized, and the grounding means 180 is activated. That is, the piston member 186b is pressed in a downward direction (toward the electric conductor 168) as viewed in FIG. 7 when air is introduced into the container 182 from the air pipe 184a, so that the piston member 186b and the piston member 186a are moved downward in a single unit. Therefore, the piston member 186a is spaced the distance H1 away from the disk-shaped member 171 of the electric conductor 168, so that electric charges remaining in the paint are discharged into the ground by the electric conductor 168, the piston member 186a, the resistor 188, the piston member 186b and the earth line 190 in that order.

Further, the storage tank 124 is charged with the electrically conductive paint. Then, air is introduced into the container 182 from the air pipe 184b of the grounding means 180 so as to integrally elevate the piston members 186a, 186b. As a result, the electric conductor 168 is spaced the distance H2 away from the piston member 186a by air.

When the spray gun 120 is moved along a work (not shown) in a state in which it has been mounted on an illustrated robot arm or the like, a portion at which the line jointer 136c mounted on the spray gun 120 is joined to the line 118, and a portion at which the line jointer 136b mounted on the protection block 134 of the voltage applying unit 116 is joined to the line 118 tend to work loose in particular. In the present embodiment, however, the line holding members 137a, 137b are provided to cover the line jointers 136b, 136c, thereby making it possible to prevent the joint portion between the line 118 and the line jointer 136b and the joint portion between the line 118 and the line jointer 136c from working loose.

Figure 8:
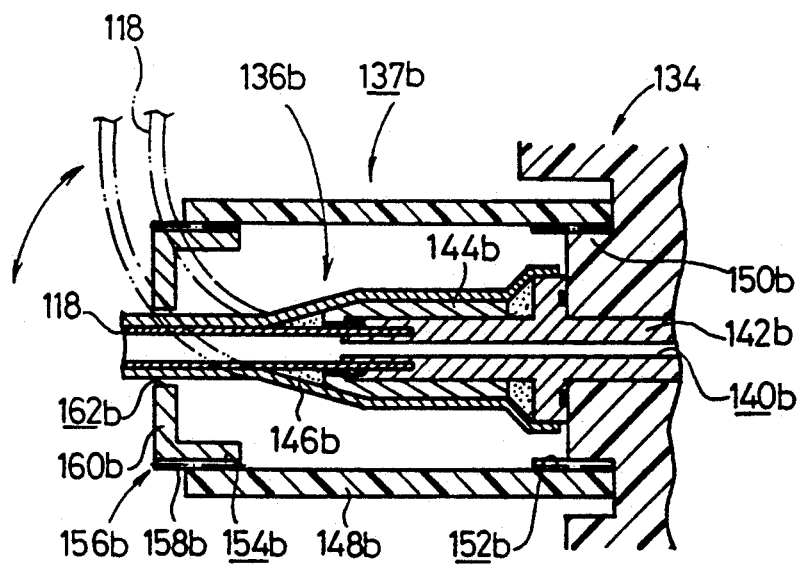
FIG. 8 is an enlarged view showing a line jointer and a line holding member of the voltage applying unit.

More specifically, as shown in FIG. 8, the line 118 is coupled to the line jointer 136b. In addition, a cylindrical member 148b is fixedly mounted on the outer periphery of the line jointer 136b by causing a thread channel or groove 152b to engage a screw thread portion 150b of the protection block 134. Furthermore, an engagement member 156b is fixed to an end of the cylindrical member 148b by the thread groove 154b and the screw thread portion 158b. A pipe 146b containing the line 118 therein is inserted into a hole 162b defined in the engagement portion 156b. Therefore, the engagement member 156b prevents the line 118 from being moved even when the line 118 is moved in accordance with the movement of the spray gun 120. Thus, the line 118 is greatly displaced as indicated by the two-dot chain line in FIG. 8, thereby making it possible to prevent gaps from being created at a portion at which the line 118 is fitted in a jointing member 142b and at a portion at which the jointing member 142b is joined to the protection block 134.

Thus, even when the spray gun 120 is moved in various directions along a work, an undesired flow of electricity can reliably be prevented from occurring in a portion at which the spray gun 120 and the line 118 are joined to each other and a portion at which the line 118 and the protection block 134 are joined to each other. As a result, a desired high voltage is accurately applied to the paint at all times, and an electrostatic spray coating process can highly accurately and efficiently be carried out. Further, the line jointers 136a through 136c have been surrounded by the line holding members 137a through 137c, respectively. Therefore, paint, dust or the like can be prevented from being applied to the respective joined portions and an undesired flow of electricity can more reliably be prevented from occurring. To use a large line jointer is unnecessary, and the electrostatic spray coating apparatus 100 can be reduced in size over its entirety.

Since the line holding members 137a and 137b are mounted on the protection block 134 of the voltage applying unit 116, and the holding member 137c is attached to the spray gun 120, the spray gun 120 can smoothly be activated. Incidentally, a line holding member 192 which is upright mounted on the floor may be used to hold or support a portion having reduced displacement as in the line 114 (see the two-dot chain line in FIG. 6).

The line jointing structure according to the present invention, which is incorporated in the electrostatic spray coating apparatus, can bring about the following advantageous effects.

According to one effect of the line jointing structure, an insulating creepage distance defined by a jointing member and a nut and insulating characteristics of seals can reliably provide electrical insulation against a connecting portion of an insulating line. It is therefore possible to prevent leakage current and sparks from being produced when a high voltage is applied to paint. In addition, the seals can provide insulation against the high voltage, and the insulating creepage distance can be shortened at a time. Thus, the entire length of the line jointing structure can easily be shortened.

According to another effect of the line jointing structure of the present invention, an insertion portion of a second member is inserted into a hole defined in a first member, and a passage for conveying electrically conductive paint is defined in integral form between the first and second members. Even though a creepage length of a screw thread portion, which is defined by the internal surface of the hole and the external surface of the insertion portion, is selected to as to reach a creepage length or less required to prevent an undesired flow of electricity, any undesired flow of electricity can reliably be prevented from occurring upon application of a high voltage to paint because insulating seals are provided.

In addition, the combined use of each insulating seal and each screw thread portion enables the overall length of the line jointing structure to be further shortened.

Furthermore, if the creepage length of a screw thread portion or the overall length of the screw thread portion and a space which are defined by an internal surface of a hole and an external surface of an insertion portion, or the axial overall length of the space defined by the internal surface of the hole and the external surface of the insertion portion, is selected so as to be the required creepage length or greater referred to above, then an undesired flow of electricity from between the first and second members can also be prevented.

According to a further effect of the line jointing structure of the present invention, a line holding member serves to prevent a flexible line coupled to a device such as a spray gun from being moved toward and away from a line jointer when the spray gun is moved along an object or work to be coated with paint, thereby making it possible to prevent a joint portion between the line and the line jointer and a joint portion between the line jointer and the device from working loose. As a result, any undesired flow of electricity can reliably be prevented from being produced from the respective joint portions, and an electrostatic spray coating process can highly accurately be carried out. In addition, the line jointer can also be reduced in size.

Having now fully described the invention, it will be apparent to those skilled in the art than many changes and modifications can be made without departing from the spirit or scope of the invention as set forth herein.

What is claimed is:

1. A line jointing structure suitable for use in an electrostatic spray painting apparatus for directly applying a high voltage to electrically conductive paint so as to electrostatically spray-coat a workpiece with paint, said line jointing structure comprising:

a jointing member having a pathway therethrough concentric with a connecting portion capable of being inserted into an end of an insulating line serving as a path for conveying the paint to which the high voltage is applied;

a sleeve disposed to cover an outer peripheral surface of said insulating line;

a nut for pressing said sleeve toward said connecting portion so as to connect said insulating line to said connecting portion, said nut having a first end and a second end and being fixedly mounted on said jointing member; and insulating seals disposed at both ends of said nut.

2. A line jointing structure according to claim 1, wherein said insulating line serves as a multiline, and a minimum-diameter line of said multiline is coupled to said connecting portion, said one of said seals being inserted into a space between an end of the remaining line of said multiline and said one end of said nut.

3. A line jointing structure according to claim 1, wherein a screw thread portion is formed between an external surface of said jointing member and an internal surface of said nut.

4. A line jointing structure suitable for use in an electrostatic spray painting apparatus for directly applying a high voltage to electrically conductive paint so as to electrostatically spray-coat a workpiece with paint, said line jointing structure comprising:
- first and second members, each having a pathway therethrough and said members connected to each other for defining, in integral form, a path for conveying electrically conductive paint to which a voltage is to be applied;
- a hole defined in said first member;
- an insertion portion mounted on said second member and capable of being inserted into said hole; and
- an insulating seal disposed between said first and second members;
- whereby a screw thread portion is formed by an internal surface of said hole and an external surface of said insertion portion, and a creepage distance of said screw thread portion is selected to provide at most the creepage distance normally required to prevent undesired creepage discharge.

5. A line jointing structure according to claim 4, wherein said second member is provided with a jointing member at one end thereof opposite to the other end where said insertion portion is mounted, said jointing member comprising:
- a connecting portion to be inserted into an insulating line at an end thereof, said insulating line serving as a path for conveying the paint to which the high voltage is applied;
- a sleeve for pressing the outer surface of said insulating line;
- a nut for applying fastening force onto said sleeve to secure said insulating line to said connection portion, said nut being fixedly mounted on said jointing member; and
- insulating seals disposed at both ends of said nut.

6. A line jointing structure suitable for use in an electrostatic spray painting apparatus for directly applying a high voltage to electrically conductive paint so as to electrostatically spray-coat a workpiece with paint, said line jointing structure comprising:
- first and second members, each having a pathway therethrough and said members connected to each other for defining, in integral form, a path for conveying electrically conductive paint to which a voltage is to be applied;
- a hole defined in said first member; and
- an insertion portion mounted on said second member and capable of being inserted into said hole;
- whereby a screw thread portion is formed by an internal surface of said hole and an external surface of said insertion portion, and a creepage distance of said screw thread portion is selected to provide at least the creepage distance normally required to prevent undesired creepage discharge.

7. A line jointing structure according to claim 6, wherein said second member is provided with a jointing member at one end thereof opposite to the other end where said insertion portion is mounted, said jointing member comprising:
- a connecting portion to be inserted into an insulating line at an end thereof, said insulating line serving as a path for conveying the paint to which the high voltage is applied;
- a sleeve for pressing the outer surface of said insulating line;
- a nut for applying fastening force onto said sleeve to secure said insulating line to said connecting portion, said nut being fixedly mounted on said jointing members; and
- insulating seals disposed at both ends of said nut.

8. A line jointing structure suitable for use in an electrostatic spray painting apparatus for directly applying a high voltage to electrically conductive paint so as to electrostatically spray-coat a workpiece with paint, said line jointing structure comprising:
- first and second members, each having a pathway therethrough and said members connected to each other for defining, in integral form, a path for conveying electrically conductive paint to which a voltage is to be applied;
- a hole defined in said first member; and
- an insertion portion mounted on said second member and capable of being inserted into said hole;
- whereby a screw thread portion and a space are created by an internal surface of said hole and an external surface of said insertion portion, and the sum of a creepage length of said screw thread portion and axial length of said space is selected to provide at least the creepage distance normally required to prevent undesired creepage discharge.

9. A line jointing structure according to claim 8, wherein said second member is provided with a jointing member at one end thereof opposite to the other end where said insertion portion is mounted, said jointing member comprising:
- a connecting portion to be inserted into an insulating line at an end thereof, said insulating line serving as a path for conveying the paint to which the high voltage is applied;
- a sleeve for pressing the outer surface of said insulating line;
- a nut for applying fastening force onto said sleeve to secure said insulating line to said connecting portion, said nut being fixedly mounted on said jointing members; and
- insulating seals disposed at both ends of said nut.

10. A line jointing structure suitable for use in an electrostatic spray painting apparatus for directly applying a high voltage to electrically conductive paint so as to electrostatically spray-coat a workpiece with paint, said line jointing structure comprising:
- first and second members, each having a pathway therethrough and said members connected to each other for defining, in integral form, a path for conveying electrically conductive paint to which a voltage is to be applied;
- a hole defined in said first member; and
- an insertion portion mounted on said second member and capable of being inserted into said hole;

fixing means for coupling said first and second members to each other;

whereby a space is defined by an internal surface of said hole and an external surface of said insertion portion, and an axial length of said space is selected to provide at least the creepage distance normally required to prevent undesired creepage discharge.

11. A line jointing structure according to claim 10, wherein said second member is provided with a jointing member at one end thereof opposite to the other end where said insertion portion is mounted, said jointing member comprising:

a connecting portion to be inserted into an insulating line at an end thereof, said insulating line serving as a path for conveying the paint to which the high voltage is applied;

a sleeve for pressing the outer surface of said insulating line;

a nut for applying fastening force onto said sleeve to secure said insulating line to said connecting portion, said nut being fixedly mounted on said jointing members; and insulating seals disposed at both ends of said nut.

* * * * *